Feb. 18, 1947.    L. L. CUNNINGHAM    2,415,812
PRESSURE REGULATOR
Original Filed June 12, 1941
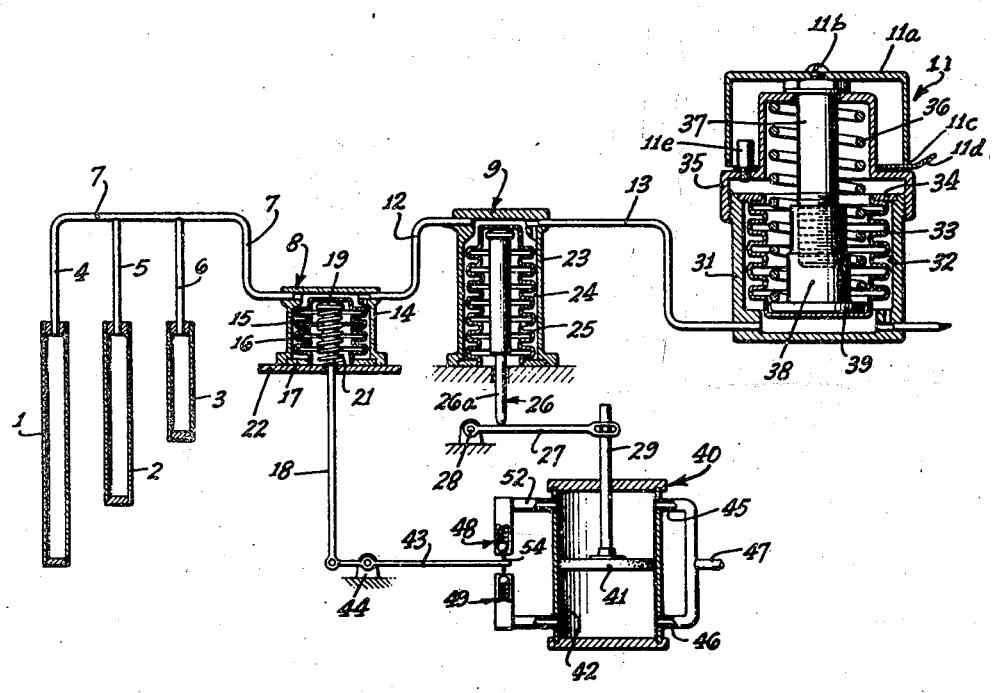
INVENTOR
LEWIS L. CUNNINGHAM;
BY
ATTORNEY.

Patented Feb. 18, 1947

2,415,812

UNITED STATES PATENT OFFICE 2,415,812

PRESSURE REGULATOR

Lewis L. Cunningham, Lutherville, Md., assignor to General Controls Co., Glendale, Calif., a corporation of California Original application June 12, 1941, Serial No. 397,827, now Patent No. 2,353,692, dated July 18, 1944. Divided and this application May 19, 1944, Serial No. 536,282

3 Claims. (Cl. 138—31)

This invention relates to systems of control in which a controlling element is moved as a result of a liquid-pressure change produced by a change in condition to which the controlling element is responsive. In such systems movement of the controlling element may be used to control the operation of suitable motor means for positioning a member to be controlled, such as a damper, an indicator, or other device which it is desired to control in response to condition changes. The present application is a division of my copending application, Serial No. 397,827, filed June 12, 1941, now Patent No. 2,353,692, issued July 18, 1944.

An object of the invention is to provide, in a liquid-pressure system of the character described, a device for regulating or adjusting the volumetric capacity of the system and thereby the liquid pressure therein.

Another object is to provide, in combination with the pressure-regulating device set forth in the preceding object, means for relieving the liquid pressure in the system in the event that that pressure tends to exceed a predetermined safe value.

Other objects and advantages of the invention will be found in the description, the drawing, and the claims; and, for full understanding of the invention, reference may be had to the following detailed description and accompanying drawing, the single figure of which is a diagrammatic view of a control system embodying my invention.

In the drawing, condition-responsive members are indicated at 1, 2, and 3 and may comprise, as one example, temperature-responsive bulbs completely filled with a suitable liquid such as ethyl ether or other suitable liquid having a high coefficient of expansion and other desired characteristics, connected by capillaries 4, 5, and 6 to a main capillary 7. The bulbs 1, 2, and 3 are adapted to cause the outflow or inflow of liquid through their associated capillaries upon the rise and fall respectively of their temperatures. In general, if all of the bulbs are subjected to a change in temperature at the same time, or if only one is changed in temperature and the others remain at a constant temperature, such change in temperature will cause flow of liquid in the capillary 7. The bulbs 1, 2, and 3 form part of a liquid-filled, liquid-confining means comprising a controlling means 8, a restoring means 9 and a regulating and relief means 11, the capillary 7 being connected to the controlling means 8. The controlling and restoring means are connected by a capillary 12, and the regulating and relief means 11 is connected to the restoring means 9 by a capillary 13.

The controlling means 8 comprises relatively rigid wall means 14 defining a generally cylindrical chamber 15 with which the capillaries 7 and 12 communicate. The controlling means 8 further comprises a relatively flexible wall 16 formed for convenience as a flexible metal bellows suitably secured at its outer end to a washer 17 which engages the wall means 14 and closes the chamber 15. The controlling means 8 further comprises a controlling element such as an operating or piston rod 18 which extends through the washer 17 and is provided with an enlarged end portion 19 which engages the bellows 16 and is biased toward the bellows by a compression spring 21 which at one end engages the enlarged portion 19 of the rod 18 and at the other end engages a plate 22 suitably secured to the wall means 14.

The restoring means 9 is constructed similarly to the controlling means 8 and comprises relatively rigid wall means 23 defining a chamber 24 which is closed on one side by a flexible metal bellows 25 and is in connection with the capillaries 12 and 13. A restoring element such as an operating or piston rod 26 is mounted with one end engaging the bellows 25 and the other end engaging a link 27 which is pivotally mounted at one end to a suitable support 28, and is slidably and pivotally connected at its other end to a piston rod 29 which in this case is adapted for movement in a direction parallel to the direction of movement of the rod 26 and may be connected to or may comprise the member to be controlled or positioned.

The regulating and relief means 11 may comprise relatively rigid wall means 31 defining a generally cylindrical chamber 32 which is open at its upper end. The open end of the chamber 32 is closed by a flexible metal bellows 33 which is secured to a washer 34 which is in turn secured in a recess in the wall means 31. A cap 35 is shown threadedly engaging the outside of the upper end of the wall means 31 and a compression spring 36 is shown in position around a tension member such as a bolt 37 which extends through the cap 35 and threadedly engages a foot member 38 having an enlarged bottom portion 39 which engages the lower end of the bellows 33. The compression spring 36 exerts its force between the inside of the cap 35 and the portion 39 of the member 38 and the force or loading on the spring is adjusted by relative movement of the members 37 and 38. The members 35, 36, 37, and 38 constitute preloaded spring means. The value of this force is such that for all normal pressures obtained in the chamber 32, there is no movement of the member 38 with respect to the cap 35. When excessive pressures are obtained in the chamber relative movement of the members 38 and 35 occurs, whereby the pressure is relieved by movement of the bellows 33 to increase the size of the chamber 32 without rupturing the walls of the liquid-confining means.

As pointed out previously, the entire system is filled with liquid and the relative volume of liquid contained in the chambers 15 and 24 for any given temperature at the bulbs 1, 2, and 3 and position of the member 29, is adjusted by relative rotation of the members 37 and 38 while the cap 35 remains stationary on the wall means 31 to which it is tightly secured. This rotation varies the amount of liquid contained in the chamber 32 and with a given amount of liquid in the chamber 24 causes variation in the amount of liquid in the chamber 15. A dial cap 11a calibrated in temperature is secured to the upper end of bolt 37 by a screw 11b for rotating the bolt with respect to the stirrup 38 which remains stationary as a result of the spring friction. The lower edge of cap 11a is provided with notches 11c engaged by a spring 11d secured to cap 35 by a screw 11e. The free end of the spring is depressed when it is desired to turn cap 11a with respect to cap 35.

The piston rod 29 is shown secured to a piston 41 which is adapted for movement in the cylinder 42 comprising a control motor means 40 according to this invention. The piston 41 is shown in the mid position of its stroke and it may be assumed for the purposes of example that the chambers 15 and 24 each contain what may be termed their "normal" volume of liquid, the rods 18 and 26 each being at positions intermediate the ends of their strokes. Furthermore, it may be assumed that the temperatures existing at the bulbs 1, 2, and 3 are such that there is no flow through the capillary 7 into or out of the chamber 15. Under such conditions the operating rods 18, 26, and 29 remain stationary and a valve-operating lever 43, which is constrained to move with the rod 18, as by pivotal connection to one end of the rod 18, remains stationary in the central position of the stroke. The lever 43 is pivotally secured intermediate its ends to a support 44.

The motor means is provided with air outlet connections 45 and 46 establishing connection between the cylinder 42 at positions on opposite sides of the piston 41, and a vacuum line connection 47 leading to a suitable subatmospheric pressure source, not shown. The motor means is further provided with valve means such as a pair of normally closed, inwardly opening, ball-check valves 48 and 49 closing the ends of air inlet conduits 52 and 53 communicating with the cylinder 42 on opposite sides of the piston 41.

When both of the valves are closed and a balanced load is connected to the member 29, the pressures in the cylinder on both sides of the piston 41 are equal and the piston remains at rest, irrespective of its position. Opening of the valve 48 causes an increase in pressure on the upper side of the piston and downward movement of the piston, while opening of the valve 49 causes reverse movement. The valve-operating lever 43 is provided with a suitable pin 54 which is adapted to open the valves 48 and 49 upon movement of the lever toward the respective valves. Suitable restriction is placed in the line 47 so that air can enter through the valves 48 and 49 faster than it can be withdrawn from the cylinder through the line 47.

Assuming now that a rise in temperature occurs at the bulbs 1, 2, and 3, the pressure in the liquid-confining system rises and liquid flows through the capillary 7 toward the respective members 8, 9, and 11. Under normal conditions the only wall in the system which can yield or move in response to this pressure change is the bellows 16 which in moving causes downward movement of the controlling element or operating rod 18 and an increase in the volume of liquid contained in the chamber 15. There can be no change in volume in the chamber 24 at this time, since the bellows 25 or second movable wall means forming part of the liquid-confining means is held by the operating rod 26 which is in turn held in position by the member 29 of the control motor. The bellows 33 is prevented from yielding by the action of the preloaded spring 36 which will not yield until abnormal pressures are obtained in the chamber 32.

The above described downward movement of the operating rod 18 move the pin 54 into contact with the valve 48, opening this valve and producing downward movement of the piston 41. This downward movement, through the agency of the link 27, produces downward movement of the restoring element or operating rod 26 of the restoring means 9 and results in an increase in volume of the chamber 24 through movement of the second movable wall means or bellows 25. The bias on the wall means 16 such as produced by the spring 21, causes upward movement of the operating rod 18 and bellows 16 so as to decrease the liquid pressure in the chamber 15 and the volume of liquid contained in the chamber 15 as the volume in the chamber 24 increases, and returns the volume and the pressure of the liquid in the chamber 15 to its normal value. When this condition is reached, the valve-operating lever 43 has returned to its central position and the valve 48 is again closed, bringing the piston 41 to rest at its new position.

A decrease in temperature will cause withdrawal of liquid through the capillary 7 from the chamber 15 and upward motion of the controlling member or operating rod 18. The pin 54 then moves to open the valve 49 to introduce air through the tube 53 into the cylinder, causing upward movement of the member 29 and the operating rod 26. Upward movement of the rod 26 results in discharge of liquid from the chamber 24 through the capillary 12 to the chamber 15 and downward movement of the operating rod 18 to restore the valve-operating lever 43 to its neutral position in which the valves 48 and 49 are closed and the piston 41 is at rest.

It may be seen from the above description that the member 29 moves to a given position for any given temperature condition existing at the bulbs 1, 2, and 3 and it reaches its central or normal position when the chambers 15 and 24 each contain their normal volumes of liquid and a normal temperature exists at the bulbs 1, 2, and 3. If the same operation is desired at another normal temperature, for example at a lower temperature, liquid is expelled from the chamber 32 by depressing spring 11d and turning dial cap 11a to move stirrup 38 downward sufficiently to fill the chambers 15 and 24 to their normal volumes, when the bulbs 1, 2, and 3 are at the new normal temperature and the piston 41 is maintained in its normal position.

I claim as my invention:

1. In a regulator for a control system comprising a confined body of liquid: means defining a chamber in communication with said liquid and comprising rigid side walls, a rigid end wall, and an extensible bellows encompassed by said side walls and joined thereto at its open end, the closed end of said bellows facing said end wall; a foot member in engagement with the inner surface of said closed end of the bellows; an elongated tension member within said bellows and extending outwardly of said side walls, said tension member being in threaded engagement with said foot member; and means for preventing axial movement of said tension member with respect to said end wall under normal pressure of the liquid in the chamber.

2. In a regulator for a control system comprising a confined body of liquid: means defining a chamber in communication with said liquid and comprising rigid side walls, a rigid end wall, and an extensible bellows encompassed by said side walls and joined thereto at its open end, the closed end of said bellows facing said end wall; a foot member in engagement with the inner surface of said closed end of the bellows; an elongated tension member within said bellows and extending outwardly of said side walls, said tension member being in threaded engagement with said foot member; means forming a rigid and fixed opposite end wall for said side walls and having an opening through which said tension member extends; and a spring urging said tension member inwardly of said opposite end wall and thereby said closed end of the bellows toward said first-mentioned end wall, said spring being of such stiffness that it can yield only when abnormal pressure is applied to the liquid in said control system.

3. In a regulator for a control system comprising a confined body of liquid: means defining a chamber in communication with said liquid and comprising rigid side walls, a rigid end wall, and an extensible bellows encompassed by said side walls and joined thereto at its open end, the closed end of said bellows facing said end wall; a foot member in engagement with the inner surface of said closed end of the bellows; an elongated tension member within said bellows and extending outwardly of said side walls, said tension member being in threaded engagement with said foot member; means forming a rigid and fixed opposite end wall for said side walls and having an opening through which said tension member extends; and a spring encircling said tension member and compressed between said opposite end wall and said foot member, said spring being of such stiffness that it can yield only when abnormal pressure is applied to the liquid in said control system.

LEWIS L. CUNNINGHAM.

REFERENCES CITED

The following references are of record in the file of this patent:

UNITED STATES PATENTS

| Number | Name | Date |
| --- | --- | --- |
| 1,971,532 | McAuley | Aug. 28, 1934 |
| 2,266,202 | Heinkel | Dec. 16, 1941 |
| 1,976,313 | Wenzel | Oct. 9, 1934 |
| 2,053,974 | Smith | Sept. 8, 1936 |
| 1,925,530 | Gotthardt | Sept. 5, 1933 |
| 2,318,706 | Newton | May 11, 1943 |
| 1,784,465 | Pepper | Dec. 9, 1930 |